(12) United States Patent
Zarian et al.

(10) Patent No.: US 6,251,311 B1
(45) Date of Patent: Jun. 26, 2001

(54) OPTICAL FIBERS AND PROCESSES AND APPARATUS FOR MAKING THE SAME

(75) Inventors: James R. Zarian, Corona Del Mar; Scott D. Dill, Mission Viejo, both of CA (US)

(73) Assignee: Lumenyte International Corp., Irvine, CA (US)

( * ) Notice: Subject to any disclaimer, the term of this patent is extended or adjusted under 35 U.S.C. 154(b) by 0 days.

(21) Appl. No.: 09/318,054

(22) Filed: May 25, 1999

Related U.S. Application Data

(63) Continuation of application No. 09/007,402, filed on Jan. 15, 1998.
(60) Provisional application No. 60/035,515, filed on Jan. 15, 1997.

(51) Int. Cl.[7] .................................................. B29D 11/00
(52) U.S. Cl. ...................... 264/1.24; 264/573; 264/40.3; 422/131; 425/149
(58) Field of Search ..................................... 264/1.1, 1.24, 264/573, 570, 40.3, 40.5; 422/131, 132, 138; 425/135, 149, 169

(56) References Cited

U.S. PATENT DOCUMENTS

| 2,238,443 | 4/1941 | Fields . | |
|---|---|---|---|
| 5,067,831 | 11/1991 | Robbins | 385/123 |
| 5,221,387 | 6/1993 | Robbins | 156/85 |
| 5,298,327 | 3/1994 | Zarian | 428/373 |
| 5,307,438 | 4/1994 | Berkey | 385/123 |
| 5,354,518 | 10/1994 | Okada | 264/1.25 |
| 5,406,641 | 4/1995 | Bigley, Jr. | 385/141 |
| 5,485,541 | 1/1996 | Bigley, Jr. | 385/141 |
| 5,579,429 | 11/1996 | Naum | 385/143 |
| 5,684,913 | 11/1997 | Suglyama | 385/143 |

*Primary Examiner*—Mathieu D. Vargot
(74) *Attorney, Agent, or Firm*—Small Larkin, LLP

(57) ABSTRACT

A large core polymeric optical fiber having improved light transmitting characteristics includes a cladding filled with a light transmitting core. The core is formed during a polymerization reaction within the cladding in which the pressure internal to the cladding is greater than the pressure external to the cladding to form a pressure differential supported by the cladding.

2 Claims, 1 Drawing Sheet

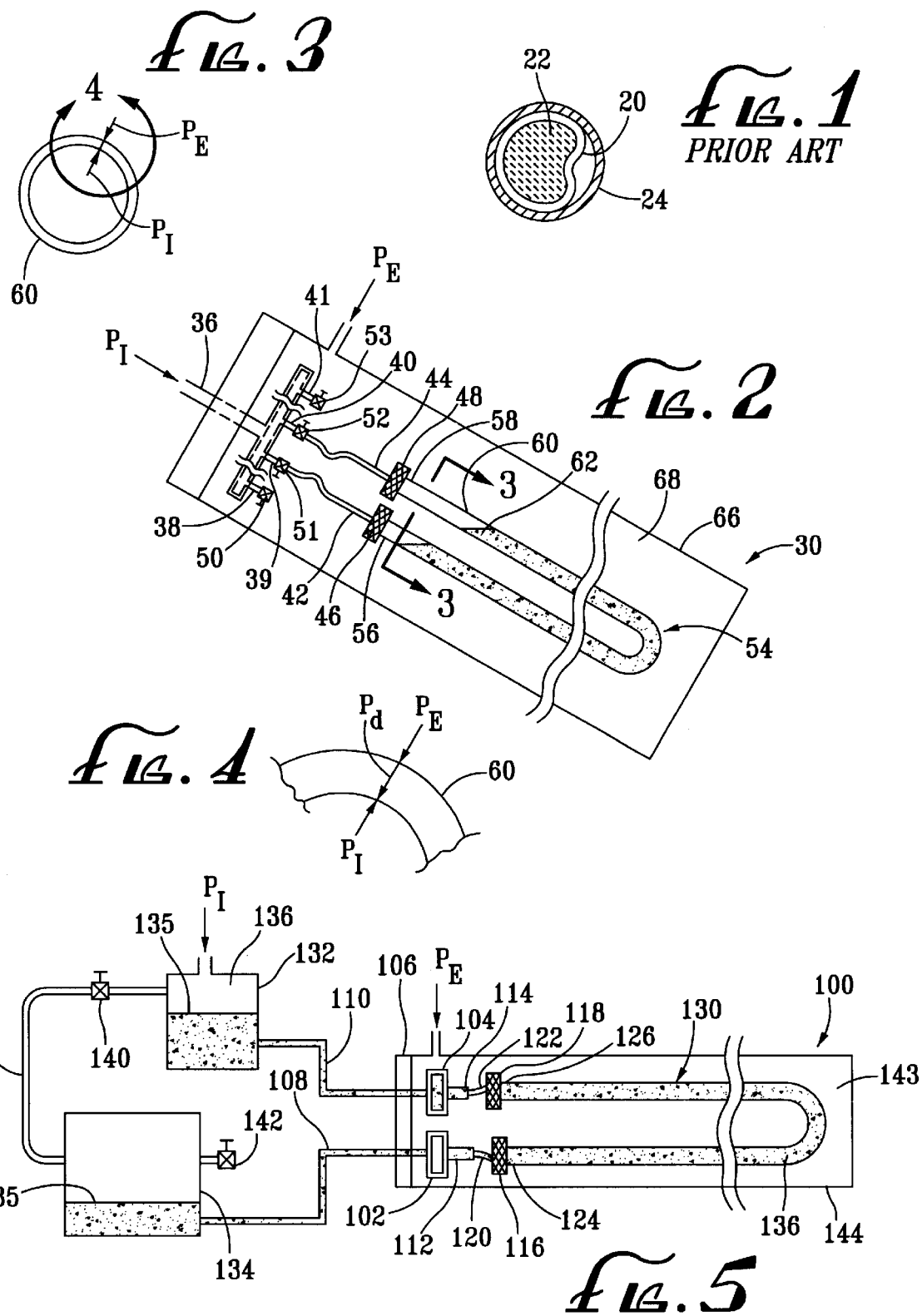

OPTICAL FIBERS AND PROCESSES AND APPARATUS FOR MAKING THE SAME

CROSS REFERENCES TO RELATED APPLICATIONS

This is a continuation application of application Ser. No. 09/007,402, filed Jan. 15, 1998, which claims priority from Provisional Patent Application Ser. No. 60/035,515, filed Jan. 15, 1997.

BACKGROUND OF THE INVENTION

A. Field of the Invention

The present invention relates to optical fibers, and an improved process and apparatus for production of the same. More particularly, the present invention relates to optical fibers having good optical properties and improved apparatus and batch process for production of the same.

B. Description of the Related Art

In the production of Large Core Polymeric Optical Fibers (LCPOF), two processes are known for such production: (1) batch and (2) continuous. The present invention is described using the batch process that uses claddings to essentially provide a mold for the light transmitting core. During the batch process, the claddings are filled with highly purified monomer mixtures and placed inside a reactor where polymerization of the monomer mixture occurs. Claddings are usually made of materials which are rather expensive and at times difficult to handle. Therefore, there is a desire to reduce cladding costs through thinner cladding walls as well as using other cladding arrangements and cladding materials.

The present batch methods of production can cause imperfections at the core-clad interface when the core becomes separated from the cladding during and after polymerization. Furthermore, voids and bubbles may form in the light transmitting core during formation. Separation of the light transmitting core from the cladding as well as the formation of voids and bubbles reduce light transmission and are undesirable.

With reference to FIG. 1, in order to avoid voids and imperfections that may occur during the polymerization reaction the cladding 20 wall is made relatively thick in the prior art. The reason is that the polymerizing mass that becomes the core 22 exerts an inward force onto the interior surface of the cladding 20—a pseudo-adhesion—during the reaction. Most monomer mixtures shrink extensively during polymerization, exerting a force inward onto the cladding 20 that they are attached to, in most cases a fluoropolymer tubing. The cladding is preferably made from fluoropolymers that inherently possess a lower refractive index. Such fluoropolymers offer many advantages such as chemical inertness, smooth (highly glossy) surface, high heat resistance and relatively low refractive indices among other attributes. Nonetheless, fluoropolymers are relatively expensive ($0.03 to 0.04/gr.), and, due to inward force exerted by the polymerizing mass, have had to be used in relatively thick wall thicknesses to retain shape (roundness). Substantial cost savings can be realized if the fluoropolymer claddings wall thickness can be extensively minimized (less than 0.1 mm) while retaining the other positive attributes. Nonetheless, fluoropolymer claddings with such thin walls, even when encased in a relatively thick manufacturing jacket, deform during the core manufacturing. The latter results from the pressure exerted inward during the polymerization of the monomer mixtures (shrinkage of the polymerizing mass).

If the force pulling inward is greater than the structural force of the cladding 20 or the force holding the cladding to the manufacturing jacket 24, then the cladding 20 is separated from the manufacturing jacket 24 and deformed—the radial uniformity along the optic is thereafter compromised. This phenomenon can be noted as de-lamination of fluoropolymer cladding 20 away from the manufacturing jacket 24, and in short "de-lamination", see FIG. 1.

Another cause of de-lamination is where a cladding arrangement is collapsed due to the external pressure experienced from the loading of claddings on top of each other as adversely encountered in some manufacturing operations. The pressure exerted from the upper claddings on the lower claddings force the lower claddings to deform, and when the upper claddings are lifted, the fluoropolymer cladding separates from the manufacturing jacket causing de-lamination.

A way to resolve the de-lamination problem is to introduce means to create a force inside the cladding, such as pressurizing the polymerizing mass inside the cladding. In addition, such pressurization is useful in reducing the number of voids and bubbles in the light transmitting core. However, there is a limit to how much pressure can be exerted onto the polymerizing mass due in part to the strength of the cladding material in which over pressurization results in bursts in, or other damage to, the cladding. Similarly, under pressurization may result in separation of the cladding from the manufacturing jacket.

The limits on the amount of pressure applied to the core, imposed by the strength of the cladding, are undesirable. The cladding strength can be improved by the use of a manufacturing jacket in which the cladding is surrounded by a jacket that is made from a stronger material than the cladding to bolster the cladding walls under higher pressures. However, the manufacturing jacket increases the cost of materials to manufacture the LCPOF and must be removed following formation of the light transmitting core. Thus, there is a need to create optics under relatively higher pressures where the optic core is made relatively free of bubbles and voids and the core-cladding interface is essentially defect free to maximize light transmission. Furthermore, it is desirable to reduce the manufacturing costs by conserving the amount of cladding material used and eliminating or reducing the need for manufacturing jackets.

SUMMARY OF THE PRESENT INVENTION

It is an object of the present invention to provide a light transmitting core which has improved light transmission properties.

It is a further object of the present invention to reduce the costs of the cladding and reduce or eliminate the need for a manufacturing jacket.

It is an advantage of the present invention to increase the absolute pressure exerted upon the polymerizing mass to reduce the number of voids and bubbles thereby improving the light transmitting properties.

It is a further advantage of the present invention to utilize relatively thin wall claddings to contain the pressurized polymerizing mass and without the need for a manufacturing jacket.

It is a feature of the present invention to provide an inner pressure upon the interior of the cladding containing the polymerizing mass and an outer pressure upon the exterior of the cladding in which the inner pressure is higher relative to the exterior pressure thereby creating a pressure differential.

The present invention is directed to an improved LCPOF with improved light transmitting properties in the light transmitting core and an improved batch process and reactor for pressuring the polymerizing mass to reduce the bubbles and voids in the light transmitting core thereby providing improved optical properties. The batch process of the present invention utilizes a cladding and polymerizing mass in a reactor in which an inner pressure is applied to the interior chamber of the cladding containing the polymerizing mass and an exterior pressure is applied to the outer surface of the cladding. The exterior pressure has a value less than the interior pressure resulting in a pressure differential between the interior and exterior pressures.

The pressure differential is determined relative to the wall thickness of the cladding and is a value less than that required to burst, or otherwise deform, the cladding wall, yet sufficiently high to prevent separation of the light transmitting core from the cladding. Thus, a relatively low pressure differential permits the use of a cladding having a correspondingly thin wall thickness and eliminates or reduces the need for a manufacturing jacket. Even a relatively small pressure differential when compared to the pressure values of the inner and outer pressures is desired given that pressure applied to the cladding wall reduces the incidents of separation of the cladding from the light transmitting core. The use of interior and exterior pressures reduces the manufacturing costs by reducing the amount of material needed to produce a thin walled cladding and by reducing or eliminating the materials needed to produce the manufacturing jacket.

The process for obtaining the inner and exterior pressures requires that both the inner and exterior pressures are increased progressively over time while maintaining the pressure differential within a desired range. In this way the interior pressure of the cladding is increased resulting in reduced bubbles and voids, while the differential pressure exerted onto the cladding wall is maintained at a relatively constant value range sufficient to prevent separation from the core without damage to the cladding.

In another aspect of the present invention, cladding material is conserved during formation of the light transmitting core, by injecting polymerizable monomer mixture continuously into the cladding during the polymerization reaction to make use of the entire length of cladding, while maintaining the pressure differential between the interior and exterior of the cladding.

Other features and advantages of this invention will be made apparent upon review of the drawings and detailed description of the invention.

BRIEF DESCRIPTION OF THE DRAWINGS

The objects and advantages of the present invention will become more readily apparent to those ordinarily skilled in the art after viewing the following detailed description and accompanying drawings wherein:

FIG. 1 is a cross-sectional view of a de-laminated cladding and light transmitting core surrounded by a manufacturing jacket;

FIG. 2 is a diagrammatic view of a reactor of the present invention;

FIG. 3 is a cross-sectional view of a cladding as shown in FIG. 2 taken along line 3—3;

FIG. 4 is an exploded partial view of the cladding of FIG. 3 taken along line 4—4; and FIG. 5 is an alternative embodiment for the reactor of the present invention.

DESCRIPTION OF THE PREFERRED EMBODIMENT(S)

The present invention provides a LCPOF having improved light transmitting characteristics through the reduction of voids and bubbles in the core. According to the present invention, ingredients for the cladding and light transmitting core and the criteria for selecting such ingredients are disclosed in U.S. Pat. No. 5,298,327, ('327) which is incorporated herein by reference.

Exemplary monomers, monomer mixtures, initiators, cross-linkers, plasticizers, chain transfer agents, and method (s) of purifying the same for use in the field of LCPOF are disclosed in the '327 patent. However, in the present invention, there are no limitations on using any of the monomers, monomer mixtures, initiators, crosslinkers, plasticizers and chain transfer agents in any combination so long as a useful LCPOF within the principles of the present invention is produced; neither are there any limitations on the steps of purification, mixing, filtration, transfer and the like so long as a useful LCPOF within the principles of the present invention is produced.

Fluoropolymers are the preferred cladding materials, and, in general, have relatively lower refractive indices than those of LCPOF cores. Fluoropolymers of the type useful for this purpose include Teflon® FEP® (fluorinated ethylene propylene) manufactured by E. I. DuPont of Delaware and THV® believed to be manufactured jointly by 3M of Saint Paul, Minn. and Hoechst AG of Germany in a joint venture d/b/a "dyneon". The wall thickness of the claddings are useful up to 4 mm, a preferred range is 0.5–1 mm and the more preferable range is less than 0.5 mm. Other polymers that can be used as cladding materials include: silicones such as poly(dimethylsiloxane), poly(methylphenylsiloxane) and fluorosilicones; poly(tetraflouroethylene) (PTFE), poly (vinylidene fluoride) (PVDF), poly(vinylfloride), fluorovinylidene-hexafluoroethylene copolymer, fluorvinylidene-hexafluoropropylene-tetrafluoroethylene and their equivalents.

Within the LCPOF field, some applications require only the light transmitting core (LTC). The LTC is the polymerized, transparent core of the optic formed within the cladding. An example of a core only application is when the LTC is combined with other components into a system to direct light in a certain direction. In such applications, there is no need to employ a relatively expensive material, such as fluoropolymer, even with very thin walls because the cladding is later stripped off and discarded. The LCPOF of this type can be manufactured by polymerizing the LTC within a cladding that is made of an inert, heat resistant and structurally stable polymer with a very high interior gloss such as polyolefins, and which are relatively inexpensive.

In addition, the claddings can be heat shrinkable. Heat shrinkable claddings are most preferred for some applications to fully fuse the cladding to the core so that a pseudo-adhesion results.

In accordance with the present invention, useful LCPOFs can be made with relatively thin-walled claddings, and with no manufacturing jacket, or with relatively thin-walled manufacturing jackets and/or finish jackets. Manufacturing jacket and finish jacket materials and their manufacture are more fully described in U.S. Pat. Nos. 5,067,831 and 5,221, 387, which are incorporated herein by reference. Preferably a manufacturing jacket is used to protect the softer fluoropolymers or other cladding materials from damage during production. Fluoropolymers jacketed with polyolefins are preferred. In some applications, a finish jacket is advantageously applied to the optic following formation of the LTC. It is preferred to use claddings with the finish jacket applied prior to formation of the LTC to reduce the number of steps in the production of LCPOF.

Following selection and preparation of the claddings and monomer mixtures, the materials are placed in a reactor for carrying out the polymerization reaction to transform the monomer mixture into a LTC. A reactor and process for conducting the polymerization reaction of the type suitable for the present invention is disclosed in U.S. Pat. Nos. 5,122,580 and 5,225,166 which are incorporated herein by reference. Most monomer mixtures used in the preparation of LCPOF shrink extensively (up to 15% or more in volume) during polymerization. The shrinkage causes the inward force that results in de-lamination and the polymer mass separating from the substrate (cladding) once the polymerization is complete. The separation is non-uniform resulting in imperfections at the core-clad interface. Advantageously, the present invention includes the step of pressurizing the monomer-filled cladding with relatively high pressures (well in excess of 5 $Kg/cm^2$) while carrying out the polymerization reaction. The advantage of including this step is that the high pressure on the polymerizing mass reduces bubble formation during the polymerization reaction as well as forcing the polymerizing mass onto the interior wall of the cladding thereby reducing defects at the core-clad interface. However, when the cladding and/or the manufacturing jacket is made relatively thin for example, less than 0.2 mm wall for a 12 mm diameter cladding and manufacturing jacket thickness of less than 1.0 mm, in comparison to a cladding wall thickness of approximately 0.8 mm and a manufacturing jacket wall thickness of approximately 2.5 mm for SWN-500 claddings manufactured by Lumenyte International Corporation, Costa Mesa, Calif. USA, the cladding and/or jacket is/are no longer able to withstand the higher pressures. The present invention permits use of the thinner walled cladding and/or jacket at relatively higher pressures without causing deformity of the cladding and/or jacket during the polymerization reaction.

This objective is achieved with modifications to the reactor and polymerization reaction process disclosed in U.S. Pat. Nos. 5,122,580 and 5,225,166, whereby pressure is added to the exterior of the cladding and/or jacket to create a differential pressure between the interior and exterior of the cladding and/or jacket. Such modifications impose no additional limitations on the polymerization reaction, for example, all otherwise operative heat initiation, UV radiation initiation, and photo-initiation techniques may be used.

In a first embodiment, a reactor 30 as set forth in U.S. Pat. No. 5,122,580 is modified as shown in the diagram of FIG. 2. The closing hatch 32 of the reactor is fitted with a manifold 34 having an inlet tube 36 and outlet tubes 38–41, tubing extensions 42 and 44, conventional compression fittings 46 and 48 and conventional valves 50–53 on the outlet tubes, and for connection to the open ends of one or more cladding assemblies 54 with any suitable, conventional means. Only one cladding assembly 54 is illustrated in FIG. 2. The fittings 46 and 48, tubing extensions 42 an 44 and valves 51 and 52 connect the open ends 56 and 58 of the cladding assembly 54 including a cladding 60 filled with a monomer mixture 62 through the outlet tubes 39 and 40 of the manifold 34. The manifold 34 provides a passageway between the cladding ends 56 and 58 and the inlet tube 36. The inlet tube 36 connects to a conventional pressure source (not shown), preferably, comprising an inert gas, such as nitrogen. Unused outlet tubes 38 and 41 are closed by the valves 50 and 53. Thus, an internal pressure chamber 64 is created within the cladding assembly 54. The cladding assembly 54 and manifold 34 is contained within the reactor tank 66. The hatch 32 is sealed over the reactor tank 66 and an external pressure chamber 68 is created around the outside of the cladding as described in U.S. Pat. No. 5,122,580.

Prior to initiation of polymerization of the mass, the pressures of the internal and external pressure chambers 64 and 68 are progressively increased to their desired values while maintaining a pressure differential as illustrated by force arrows $P_I$, $P_E$ and $P_d$ in FIGS. 3 and 4. The pressure $P_I$ of the internal pressure chamber 64, inside the cladding, is raised, preferably to 2 $Kg/cm^2$. Next, the pressure $P_E$ of the external pressure chamber inside the reactor is increased to 1 $Kg/cm^2$, thereby creating a differential pressure $P_d$ of 1 $Kg/cm^2$ between the internal and the external pressure chambers 64 and 68. Next, the pressure $P_I$ of the internal pressure chamber is raised to 3 $Kg/cm^2$; and the pressure $P_E$ of external pressure chamber is raised to 2 $Kg/cm^2$, while maintaining a pressure differential $P_d$ that varies between 1–2 $kg/cm^3$. These steps are repeated until the pressures of internal and external pressure chambers 64 and 68 preferably exceed 10 $kg/cm^2$, for example, the pressure $P_I$ of the internal pressure chamber is raised to 20 $Kg/cm^2$ and the pressure $P_E$ of the external pressure chamber is raised to 19 $Kg/cm^2$. It is noted that throughout the pressurization steps, a pressure differential $P_d$ within the range of 2 $Kg/cm^2$ to 1 $Kg/cm^2$ is created and maintained. Following pressurization, cooling and polymerization as disclosed in U.S. Pat. No. 5,225,166 is initiated. At the onset of the core formation process, the filled claddings 60 are kept cold (cold zone) below the critical polymerization reaction temperature. Hot fluid sufficient to induce polymerization is introduced to the bottom of the reactor and raised progressively creating a hot zone. The volume of the cold zone and the hot zone are therefore reduced and increased to the same extent. Both fluids are re-circulated to maintain a constant temperature. Normally, provisions are made to create a very calm interface between the circulating hot and cold zones, U.S. Pat. No. 5,225,166. The cold zone prevents the polymerization from occurring and allowing the monomer mixture 62 to flow down inside the claddings. The next steps are the same as disclosed in U.S. Pat. No. 5,225,166, except that the pressure in the internal pressure chamber additionally forces the monomer mixture 62 downward inside the cladding 60. The differential pressure $P_d$ is maintained by supplying the inert gas as necessary to both the internal and external pressure chambers 64 and 68 as needed. In U.S. Pat. No. 5,225,166, the pressure inside the reactor, around the cladding and on the monomer mixture is always the same. No pressure differential is created. This is because only the reactor is pressurized with the monomer mixture exposed to the reactor. Therefore all reach an equilibrium state concurrently and remain there during the polymerization reaction. Accordingly, the unpolymerized monomer mixture flows downward inside a cladding by gravity alone during the reaction.

It will be appreciated by those skilled in the art that the progressive pressurization of the internal and external pressure chambers may be initiated in discrete, sequential increments as described above or discrete simultaneous increments, or conducted continuously for example under a conventional computer controlled feedback and control system which, both chambers pressurized simultaneously. In the event of over-pressurization of the internal or external pressure chambers, pressure may also be maintained constant by strategically placed and regulated pressure relief valves (not shown). Also other assemblies for creating the internal and external pressure chambers may be used. Regardless of the implementation, the pressure differential should be maintained within the range of pressures useful for the selected cladding assembly, and preferably within the range of 1–10 Kg/cm².

Finished optics are withdrawn from the reactor in 24 to 72 hours depending on the length and/or the chemical composition used. Specific conditions for conducting the reaction, for example, initiation temperature, pressure $P_I$ and $P_E$ and pressure differentials $P_d$ and the rate of raising the hot zone in the reactor may vary according to the desired product. For example, if a low temperature initiator is used such as diisopropyl peroxide, the preferred initiation and polymerization temperature is within the range of 35–60 C°.

A second embodiment of a reactor 100 as illustrated by FIG. 5 utilizes the full length of the cladding(s). During the polymerization reaction, 10–15% of the volume of the monomer mixture is lost. For instance, typically, a 35 m length of cladding is used to obtain a final optic length of 30 m. The unused 5 m of the cladding is thereafter discarded. It is desirable to prevent the loss of cladding material. With reference to FIG. 5, two manifolds 102 and 104 are attached to the hatch 106, each having an inlet tube 108 and 110 and outlet tubes 112 and 114. The outlet tubes 112 and 114 connect through fittings 116 and 118 and tubing extensions 120 and 122 to respective ends 124 and 126 of a cladding assembly 130. Two exterior tanks 132 and 134 connect to the inlet tubes 108 and 110 of the manifolds 102 and 104. A first or inlet tank 132 is large enough to contain the monomer mixture 135 needed for the reaction. A second or outlet tank 134 is large enough to hold any excess mixture 135. Once the cladding assembly has been filled, the excess mixture which is in both the inlet and outlet should be sufficient to supply mixture to the cladding assembly during the 10–20% shrinkage that occurs during the reaction. The exterior tanks 132 and 134 are able to withstand high pressures and are kept cold. The manifolds 102 and 104 are arranged in such a manner to define an inlet and outlet passageway between the cladding assembly 130 and the inlet and outlet tanks 132 and 134 forming an internal pressure chamber 136. The inlet and outlet tanks 132 and 134 are connected to tubing 138 and controlled by a valve 140. The outlet tank 134 includes a valve 142 connected to ambient air. The inlet tank 132 is connected to a pressure source (not shown) preferably containing an inert gas, such as nitrogen. An external pressure chamber provided by the hatch 106 sealed onto a reactor chamber 144 as disclosed in U.S. Pat. No. 5,225,166.

In operation, the first or inlet tank 132 containing the monomer mixture 135 is sufficiently pressurized to force the monomer mixture into the inlet manifold 104 and the cladding assembly 130. Excess monomer mixture exits the cladding assembly 130 through the outlet manifold 102 spilling into the second or outlet tank 134 which is opened to the atmosphere by valve 142. Once the monomer mixture 135 has entered the second tank 134, the second tank 134 is closed to the atmosphere by valve 142. Next, both the inlet and outlet tanks 132 and 134 are connected by opening valve 140 and the pressure is stabilized between them. The remaining steps are repeated as in the steps of the first embodiment where the internal and external pressure chambers 136 and 143 are progressively pressurized. The pressure $P_1$ on the monomer mixture 135 in both tanks 132 and 134 supplies the higher positive pressure inside the cladding assembly 130. The excess monomer mixture in tanks 132 and 134 provide a constant supply of additional monomer mixture 135 to the cladding assembly 130 as necessary due to shrinkage. The result is that an LTC is produced with little or no loss of cladding material. It should be noted that multiple cladding assemblies may be included in the reactor using inlet and outlet manifolds similar to the first embodiment manifold 34 (FIG. 2).

The objects, features and advantages of the present invention are further illustrated by the following examples, but the particular methods, conditions, materials and steps recited in these examples, as well as other details, should not intended to limit this invention, which limits are set forth in the claims herein.

EXAMPLES

Example 1

An FEP Teflon® cladding with a an inside diameter (ID) of approximate 11 mm and a wall thickness of 0.51 mm was heat expanded to an approximate internal diameter of 12 mm and wall of 0.46 mm and jacketed with a manufacturing jacket made of poly(ethylene) having an approximate wall thickness of 1.8 mm. A 35 m length of this cladding and manufacturing jacket combination was filled with a monomer mixture of approximately 50 parts by volume of highly purified (distilled under vacuum) methyl methacrylate, 50 parts by volume of CR-39 manufactured by PPG, Ind. of Pittsburgh, Pa. and initiated with 0.6 parts by volume of isopropyl peroxide. The cladding filled with the monomer mixture was formed into a U shape and placed inside a reactor as described in U.S. Pat. No. 5,225,166. The reactor was modified to the first embodiment as illustrated by FIG. 2 herein. The cladding assembly was attached using fittings of the compression fitting type manufactured by Swagelock® of Solon, Ohio.

The hatch was closed and the reactor allowed to cool for approximately one hour. Nitrogen gas at a pressure of approx. 2.82 Kg/cm² (40 psi) was introduced into the internal pressure chamber. Using a different nitrogen tank, the external pressure chamber was pressurized to 1.41 Kg/cm² (20 psi). Next, the internal pressure chamber pressure was raised to 4.23 Kg/cm² (60 psi). Next, the external pressure chamber pressure was raised to 2.82 Kg/cm² (40 psi). Progressively and in the same manner, the internal and external pressure chamber pressures were raised as follows:

| Inlet Pressure Kg/cm² | Reactor Pressure Kg/cm² | Differential Kg/cm² |
| --- | --- | --- |
| 7.05 | 5.64 | 1.41 |
| 8.46 | 7.05 | 1.41 |
| 9.87 | 8.46 | 1.41 |
| 11.28 | 9.87 | 1.41 |
| 12.69 | 11.28 | 1.41 |
| 14.10 | 12.69 | 1.41 |
| 15.51 | 14.10 | 1.41 |
| 16.92 | 15.51 | 1.41 |
| 18.33 | 16.92 | 1.41 |

In each step, the pressure differential was generally maintained at 1.41 Kg/cm² (20 psi). The duration of this pressurization was approximately ½ hour. Following these steps, the pressure on the polymerizing mass and the interior pressure chamber pressure was at 18.33 Kg/cm² while the external pressure chamber pressure was at 16.92 Kg/cm².

Hot water at 45° C. was next introduced into the reactor at the rate of approximately 1 m/hr. The introduction of hot water was completed after approximately 17 hours, and the reactor was allowed to remain at the same temperature for another 2 hours. The temperature of the reactor was successively raised to 55° C. over two hours, 65° C. over two hours, 75° C. over 5 hours and 85° C. over 5 hours. The reactor was shut down and the temperature allowed to reach room temperature while still maintaining the pressure of the internal and external pressure chambers.

The internal and external pressure chambers were next de-pressurized in the reverse order of pressurization stated above: First the internal pressure chamber pressure was reduced to 16.92 Kg/cm$^2$. Next the external pressure chamber pressure was reduced to 15.51 Kg/cm$^2$. Depressurization continued in this progressive manner, while maintaining generally the same pressure differential until the reactor was completely de-pressurized, i.e. reached atmospheric pressure.

The cladding was withdrawn from the reactor and the manufacturing jacket removed. Although, the core-clad interface seemed to be in very close proximity, nonetheless, some separations were noticed in some areas. A final heat shrinking of the clad resulted in a very uniform appearance. An optic with a length of 30 meters with excellent light transmission properties and no noticeable deformity of the cladding was obtained in this manner.

Example 2

An FEP Teflon cladding with an inside diameter (ID) of approximately 12 mm and a wall thickness of 0.2 mm was jacketed with manufacturing jacket made of black poly (vinyl chloride) (PVC) having Shore dorameter of approximately 96 on the A Scale which indicates softness of the material. The jacket had a thickness of approximately 2 mm. Every step as was noted in Example 1 was followed to produce a 30 m optic. The optic with such thin FEP cladding and soft PVC jacketing exhibited no deformities and had excellent light transmission. There was no need to remove the manufacturing jacket and subject the optic to a secondary operation—extrusion of the PVC which is normally done with optics produced according to the prior art after the manufacturing jacket is removed.

The optics made in the above examples exhibited fewer and smaller bubbles and voids, and an improved core-clad interface, and had more uniform cross-section along the length of the optic, all of which resulted in higher light transmission compared to light transmission in the optics disclosed in U.S. Pat. No. 5,298,327.

It will be appreciated by those skilled in the art that the creation of a pressure differential between an internal and external pressure may be used with the continuous process for manufacturing LCPOF. This description is not intended to limit the invention to the batch process.

It will be understood that certain features and subcombinations are of utility and may be employed without reference to other features and sub-combinations as they are outlined within the claims. While the preferred embodiment and application of the invention has been described, it is apparent to those skilled in the art that the objects and features of the present invention are only limited as set forth in claims attached hereto.

What is claimed is:

1. A method for preparing a large core polymeric optical fiber in a vessel comprising the steps of:

filling a cladding with a monomer mixture; and simultaneously polymerizing said monomer mixture to form a light transmitting core, pressurizing the monomer mixture to an internal pressure and pressurizing the cladding external surface to an external pressure; said external pressure being less than said internal pressure, whereby said internal and external pressures are increased progressively over time until desired pressure values are reached for each while maintaining a pressure difference between the internal and the external pressure within a desired range.

2. A large core polymeric optical fiber production vessel comprising:

a reaction vessel having an open end;

a closing hatch adapted to seal the open end;

a manifold positioned inside of the vessel adjacent the hatch, having a gas inlet tube adapted for connection to a gaseous pressure source, extending through the hatch and having at least one tubular outlet;

at least two fittings adapted for connection to open ends of one or more cladding assemblies; and means to apply and regulate progressively over time pressure inside said reaction vessel and pressure inside said manifold and to maintain within a desired range a difference between the internal and external pressures applied to said cladding assemblies.

* * * * *